United States Patent [19]

Shimizu et al.

[11] Patent Number: 5,427,520
[45] Date of Patent: Jun. 27, 1995

[54] MOLD DEVICE FOR FABRICATING DISC SUBSTRATE

[75] Inventors: Jun Shimizu; Junichiro Kudo, both of Miyagi, Japan

[73] Assignee: Sony Corporation, Japan

[21] Appl. No.: 4,278

[22] Filed: Jan. 14, 1993

[30] Foreign Application Priority Data

Jan. 31, 1992 [JP] Japan ................. 4-042002
Feb. 7, 1992 [JP] Japan ................. 4-056947

[51] Int. Cl.⁶ ............... B29C 45/38; B29C 45/40; B29D 17/00
[52] U.S. Cl. .................. 425/556; 425/422; 425/436 R; 425/436 RM; 425/810; 264/107; 249/66.1
[58] Field of Search ............ 425/556, 810, 436 R, 425/436 RM, 422, DIG. 51; 264/107; 249/66.1

[56] References Cited

U.S. PATENT DOCUMENTS

| | | | |
|---|---|---|---|
| 3,687,591 | 8/1972 | Perego | 425/556 |
| 4,155,698 | 5/1979 | Aichinger | 425/556 |
| 4,327,047 | 4/1982 | McNeely | 264/107 |
| 4,334,849 | 6/1982 | Bock | 264/107 |
| 4,372,741 | 2/1983 | Cane et al. | 425/556 |
| 4,741,689 | 5/1988 | Onizawa et al. | 425/542 |
| 4,777,004 | 10/1988 | Galer | 425/556 |
| 5,006,058 | 4/1991 | Maruyama et al. | 425/556 |
| 5,092,758 | 3/1992 | Tanaka et al. | 425/810 |
| 5,092,759 | 3/1992 | Lichtinger et al. | 425/810 |
| 5,106,553 | 4/1992 | Onisawa et al. | 425/556 |
| 5,160,751 | 11/1992 | Eichlseder et al. | 425/556 |
| 5,180,595 | 1/1993 | Kinoshita | 425/810 |

FOREIGN PATENT DOCUMENTS

| | | |
|---|---|---|
| 0018210 | 10/1980 | European Pat. Off. . |
| 0118146 | 9/1984 | European Pat. Off. . |
| 0233644 | 8/1987 | European Pat. Off. . |
| 0266746 | 5/1988 | European Pat. Off. . |
| 0278358 | 8/1988 | European Pat. Off. . |
| 0355589 | 2/1990 | European Pat. Off. . |
| 0449517 | 10/1991 | European Pat. Off. . |
| 1123873 | 10/1956 | France ................. 425/556 |
| 147522 | 4/1981 | German Dem. Rep. ....... 425/556 |
| 3015137 | 11/1980 | Germany . |
| 3223133 | 12/1983 | Germany . |
| 4-135726 | 5/1992 | Japan ................. 425/556 |

Primary Examiner—Khanh Nguyen
Attorney, Agent, or Firm—Ronald P. Kananen

[57] ABSTRACT

A metal mold device for molding a disc substrate formed by molding a synthetic resin material and having a raised portion on the inner surface of the disc substrate, includes a fixed metal mold and a movable metal mold for defining together a mold cavity for molding the disc substrate. A mold releasing resistance in the form of suitably sized projections or recesses, is provided at a portion of the fixed metal mold or the movable metal mold mating with the outer rim of the disc substrate being molded or at the outer peripheral surface of the raised portion to permit an as-molded disc substrate to be released easily and reliably from a stamper bearing a pattern of pits and lands or pre-grooves and to prevent molding distortions from being produced in the disc substrate being molded.

9 Claims, 12 Drawing Sheets

MOLD DEVICE FOR FABRICATING DISC SUBSTRATE

BACKGROUND OF THE INVENTION

1. Field of the Invention

This invention relates to a mold device for fabricating a disc substrate constituting a disc, such as an optical disc or a magneto-optical disc, as a recording medium for information signals, by molding synthetic resin, and a disc substrate fabricated using the mold device.

2. Description of the Related Art

There has hitherto been proposed an optical disc comprising a disc substrate fabricated from synthetic resin exhibiting light transmitting properties, such as polycarbonate resin. As the disc of this type, there are currently known a read-only optical disc for only reproducing recorded information signals, and a magneto-optical disc capable of overwriting the recorded information signals. The read-only optical disc comprises a disc substrate having a predetermined pattern of pits and lands corresponding to information signals, such as music signals, formed thereon, and a reflective film formed by e.g. Al evaporation on one of the major surfaces of the disc substrate. On the other hand, the magneto-optical disc capable of overwriting information signals comprises a disc substrate having a signal recording layer including a magnetic film formed on one of its major surfaces bearing a number of pre-grooves defining a recording tracks for recording desired information signals.

It is possible with this type of the optical disc to record information signals, such as digitized music signals, with an extremely high recording density. The present Applicant has already proposed an optical disc which is 64 mm in diameter and capable of recording/reproducing or only reproducing music signals continuously for at least 74 minutes.

This optical disc 1 has a disc substrate 2, which is fabricated by molding synthetic resin exhibiting light-transmitting properties, such as polycarbonate resin, and on one major surface of which a perpendicular magnetic recording film, for example, is deposited for forming a signal recording layer, as shown in FIG. 1. For recording information signals on the optical disc 1, a light beam emitted from an optical pickup is radiated on the recording track formed in a signal recording section provided with the signal recording layer, whilst the optical disc 1 is rotationally driven at a preset rotational velocity and an external magnetic field modulated in accordance with information signals to be recorded is supplied thereto from an external magnetic field generating device, not shown.

Since the optical disc 1 is of a reduced diameter and has fine recording tracks formed thereon with extremely high density, it is necessary for the disc to be loaded in position on and made fast with a disc table 4 of a disc rotating driving unit 3 provided within a disc rotating/reproducing apparatus adapted for rotationally driving the optical disc 1, so that the disc may be rotationally driven in a correctly timed relation with respect to the rotation of the disc table 4.

For this reason, there is formed, on a major surface 2c opposite to the surface 2b of a main portion 2a bearing the signal recording layer of the disc substrate 2 constituting the optical disc 1, a central raised portion 8, the distal end face of which has a loading reference surface 7 for accurately setting the loading height position of the disc on the disc table 4. The raised portion 8 is formed as an annulus having an engaging aperture 6 adapted for being engaged by a centering member 5 which is provided at a center of rotation of the disc table 4 and which is adapted for assuring correct centering of the optical disc 1 loaded on the disc table 4. The engaging aperture 6 is adapted for communication with a centering aperture 6a provided in the main portion of the substrate 2a.

A thin metal plate 9 is provided on one of the major surfaces 2b of the disc substrate 2 for closing the centering aperture 6a and is adapted for being magnetically attracted by a magnet 10 provided on the disc table 4 for unifying the optical disc 1 loaded on the disc table 4 to the disc table 4.

The above-described optical disc 1 is loaded on the disc table 4 at the correctly set loading height position, with its center coincident with the center of rotation of the disc table 4, by having the centering member 5 engaged in the engaging aperture 6 and by having the loading reference surface 7 on the end face of the raised portion 8 supported on a disc supporting surface 4a of the disc table 4, with the metal plate 9 being then attracted by the magnet 10, as shown in FIG. 2.

The disc substrate 2 of the optical disc 1 is fabricated by injection molding of synthetic resin, such as polycarbonate, by an injection molding metal mold device.

A metal mold device as shown in FIG. 3 has been proposed for molding the disc substrate 2. The metal mold device includes a metal mold unit 1S made up of a fixed metal mold 11 and a movable metal mold 12 which is provided facing the fixed metal mold 11 and movably supported by a hydraulic device, not shown, for being moved towards and away from the fixed metal mold 11. A mold cavity 14 corresponding in contour to the disc substrate 2 to be molded is defined between the fixed metal mold 11 and the movable metal mold 12 making up the metal mold unit The fixed metal mold 11 is provided with a sprue bushing 15, at the center of the mold cavity 14, for permitting the synthetic resin, such as molten polycarbonate resin, supplied from an injection molding machine, not shown, to flow into the mold cavity 4. The sprue bushing 15 has a central resin injection opening 16, via which the molten synthetic resin, supplied from the injection molding machine, is injected and charged into the mold cavity 14.

The fixed metal mold 11 has a molding surface 11a which defines the mold cavity 14 and which is formed as a smooth mirror surface to permit molding of the opposite major surface 2c of the disc substrate 2 which is to be a light beam incident surface. On the outer peripheral surface of the sprue bushing 15, there is provided an insert 18 for defining a recess 17 for molding the raised portion 18 which is to be raised on the major surface 2c of the disc substrate 2 and which has the loading reference surface 7.

On a molding surface 12a defining the mold cavity 14 of the movable mold cavity 12 is mounted a stamper 19 for forming a pattern of micro-sized pits and lands corresponding to information signals recorded on the optical disc 1 or pre-grooves defining recording track(s) formed on the signal recording section of the optical disc 1. The stamper 19 is loaded on the molding surface 12 by having a fitting projection 21 on the distal end of a stamper holder 20 provided at the center of the movable metal mold 12 fitted into its center opening 22 and by having its outer periphery supported by a pawl 23a of an outer peripheral stamper holder Meanwhile, the pawl 23a of the stamper holder 29 holding the stamper 19 has its inner peripheral surface formed as a molding surface for producing the outer periphery of the disc substrate 2 molded in the mold cavity 14.

On an inner periphery of the stamper holder 20, there is provided a perforating punch 24 for punching the engaging opening 6 at the center of the raised portion 8 of the disc substrate The perforating punch 24 is passed through a sleeve 25 provided on an inner periphery of the stamper holder 20 for reciprocation therein. An air passage 26 is defined between the sleeve 25 and the stamper holder 26 for releasing the as-molded disc substrate 2 from the movable metal mold 12.

For molding the disc substrate 2, using the above-described metal mold device, the movable metal mold 12 is caused to approach the fixed metal mold 11 for establishing a mold clamping state. In this mold clamping state, molten synthetic resin, such as molten polycarbonate resin, supplied from an injection molding machine, not shown, is injected and charged into the mold cavity 14 via resin injection opening 16 in the sprue bushing 15. The movable metal mold 12 is moved towards the fixed metal mold 11 for compressing the synthetic resin charged into the mold cavity 14, by way of mold clamping. The synthetic resin thus compressed is then allowed to cool for molding the disc substrate 2 corresponding in contour to the mold cavity 14. The movable metal mold 12 is then moved away from the fixed metal mold 11, by way of mold opening, at the same time that releasing air is injected via air passage 26 into the mold cavity 14 for releasing the disc substrate 2 from the movable metal mold 12. The disc substrate 1S is then taken out by a suitable take-out device for completing the molding of the disc substrate 2.

Meanwhile, with the above-described metal mold device, the stamper 17 for forming pits and lands or pre-grooves on one of the major surfaces of the disc substrate 2 is supported on the molding surface of the movable metal mold 12 by having its peripheral side supported by the stamper holder.

In an alternative metal mold device, the stamper is loaded on the disc molding surface of the fixed metal mold or the movable metal mold by having the rim of its center opening and its outer periphery supported by an inner peripheral stamper holder and by an outer peripheral stamper holder, respectively.

If the stamper is supported in this manner by the stamper holder, part of the synthetic resin is intruded into a space between the stamper and the stamper holder to produce burrs on the disc substrate being molded when the molten synthetic resin is charged into the mold cavity. If such burrs are produced on the outer peripheral stamper holder or its neighborhood, mold releasing resistance is increased excessively to render it impossible to release the as-molded disc substrate from the stamper. On the other hand, if the releasing resistance is increased excessively to render it impossible to release the as-molded disc substrate from the stamper, the as-molded disc substrate undergoes molding distortion and abnormal polarization to render it impossible to employ it as the disc substrate for the optical disc.

On the other hand, if the perforating punch 24 for punching the engaging opening 6 is provided at the movable metal mold 12 fitted with the stamper 19 for fabricating the disc substrate 2, as in the case of the metal mold device as shown in FIG. 3, a punching burr 27 tends to be produced on the rim of the engaging opening 6 directed to the loading reference surface 7 at the distal end face of the perforating punch 24, as shown in FIG. 4.

The rim of the engaging opening 6 in the disc substrate 2 engaged by the loading reference surface 7 is engaged with the outer peripheral surface of the centering member 5 for centering the disc, while the loading reference surface 7 is to be the reference surface for setting the disc loading height on the disc table 4. Consequently, with the optical disc 1, fabricated from the disc substrate 2 having the burr 27 from punching on the rim of the engaging opening 6 directed towards the loading reference plane 7, the centering member 5 cannot be engaged accurately in the engaging opening 6, so that the optical disc 1 is loaded on the disc table 64 without centering or setting the loading position with respect to the disc table 4. The optical disc loaded under these conditions is in an offset state and is rotationally driven with the disc surface deviation from horizontal to render it impossible to record/reproduce information signals accurately.

For preventing punching burrs 27 from being produced in the rim of the engaging opening 6 directed towards the loading reference plane 7 at the end face of the raised portion 8 of the disc substrate 2, there is also proposed a metal mold device for molding a disc substrate, which is constructed and arranged as shown in FIG. 5.

In contradistinction from the above-described metal mold device, this metal mold device is provided with the stamper 17 on the side fixed metal mold 11, and the perforating punch 24 for perforating the engaging opening 6a is provided on the side movable metal mold 12, as shown in FIG. 5, so that the engaging opening 6 is punched from the loading reference surface 7 to prevent punching burrs from being produced on the rim of the engaging opening 6 directed towards the loading reference surface 7.

Meanwhile, with the metal mold device shown in FIG. 5, the perforating punch 24 is provided for reciprocating movement in a sleeve 28 mounted at the center of the movable metal mold 12 for defining the recess 17 corresponding in contour to the raised portion of the disc. The sleeve 28 may be reciprocated for releasing the as-molded disc substrate 2 out of the movable metal mold 12.

However, with the metal mold device, shown in FIG. 5, when the molten synthetic resin is charged into the mold cavity 14, part of the synthetic material is intruded into the space between the stamper 19 and the outer peripheral stamper holder 23 supporting the stamper 19 on the fixed metal mold 11 for producing a burr 29 on the outer rim of the as-molded disc substrate. If such burr 29, which is clamped between the stamper 19 and the outer peripheral stamper holder 23, is produced, the releasing resistance offered from the fixed metal mold 11 mounting the stamper 19 is increased excessively to render it impossible to release the as-molded disc substrate 2 from the stamper 19 reliably.

If the release resistance is increased in this manner to render it difficult to release the as-molded disc substrate 2 from the stamper 19 loaded on the fixed metal mold 11, it becomes difficult to open the mold device to take out the as-molded disc substrate from the molding metal mold 13.

Meanwhile, intrusion of the synthetic resin material into a space between the stamper 1a and the outer peripheral stamper holder 23 to produce burrs 29 on the outer peripheral side of the disc substrate 2 to render releasing of the disc substrate 2 from the stamper 19 also occurs in the mold device shown in FIG. 3.

Although it may be contemplated to inject releasing compressed air between the disc substrate 2 and the stamper 19 for preventing releasing failure of the disc substrate 2 from stamper 19, it is extremely difficult to inject the compressed air uniformly onto the major surface of the as-molded disc substrate 2, so that mold releasing cannot be achieved reliably.

OBJECTS AND SUMMARY OF THE INVENTION

It is an object of the present invention to provide a metal mold device for fabricating a disc substrate whereby the disc substrate may be fabricated without producing molding distortion and with improved molding accuracy.

It is another object of the present invention to provide a metal mold device for fabricating a disc substrate whereby the as-molded disc substrate may be easily and reliably from the stamper used for forming a pattern of minute pits and lands or pre-grooves for defining a recording track(s).

It is a further object of the present invention to provide a metal mold device for molding a disc substrate having a raised portion on a major surface of a substrate main body having a loading reference surface with respect to disc rotating means at its end face and a central through-opening, whereby it becomes possible to fabricate the disc substrate with improved molding accuracy so that burrs which might deteriorate the molding accuracy are not produced in the portion of the disc substrate which is to be the loading reference surface for the disc rotating means.

It is a further object of the present invention to provide a metal mold device for molding a disc substrate whereby the device may be simplified in structure.

It is yet another object of the present invention to provide a disc substrate whereby it is possible to fabricate an optical disc which may be loaded in position on the disc rotating and driving unit of the disc driving device.

In accordance with the present invention, there is provided a metal mold device for molding a disc substrate from a synthetic resin material, which disc substrate has a raised portion on an inner surface of a main body of the disc substrate, the metal mold device comprising a fixed metal mold for defining a mold cavity for molding said disc substrate, and a movable metal mold provided facing the fixed metal mold for defining the mold cavity along with the fixed metal mold, the portion of the fixed metal mold or the movable metal mold defining the mold cavity including mold releasing resisting means.

With the above-described metal mold device according to the present invention, when the movable metal mold is moved in a direction away from the fixed metal mold after the end of molding, the as-molded disc substrate is controlled by the metal mold releasing resisting means with respect to the metal mold releasing direction, so that the as-molded disc substrate may be released from the stamper loaded on the fixed metal mold or the movable metal mold.

The recesses or bosses, corresponding to the mold releasing resisting means, are formed on the outer peripheral surface of the raised portion of the disc substrate or on the outer rim of the main portion of the substrate to prevent any adverse effect on the loading reference surface on the distal end face of the raised portion or on the major surface o the disc substrate having the pits and lands or pre-grooves.

In accordance with he present invention, there is provided a metal mold device or molding a disc substrate made up of a main portion of the substrate having fine pits and lands or grooves on one of its major surfaces and a raised portion provided for being projected on the opposite major surface of the main portion and having a central through-hole, with the distal end face of the raised portion being a loading reference surface for loading on disc rotating and driving means. The mold device comprises a fixed metal mold for defining a mold cavity for molding the disc substrate, and a movable metal mold provided facing the fixed metal mold for defining the mold cavity along with the fixed metal mold, a stamper arranged on a disc substrate molding surface of the fixed metal mold, a perforating punch for perforating a through-hole in the raised portion of said disc substrate provided at the movable metal mold, and a sliding member mounted for reciprocating movement on the outer periphery of the movable metal mold for shaping the outer peripheral surface of the disc substrate, at least one of the movable metal mold and the fixed metal mold comprising metal mold releasing resisting means for an as-molded disc substrate.

With the above-described metal mold device, when molten synthetic resin is charged into the mold cavity for molding the disc substrate defined between the fixed and movable metal molds, the movable metal mold is moved, under the pressure of the molten resin, in a direction away from the fixed metal mold. The sliding member mounted for reciprocating movement at the outer peripheral side of the movable metal mold is moved relative to the movable metal mold and caused to be abutted on the fixed metal mold to prevent a void via which molten resin is extruded out of the mold cavity from being produced.

DESCRIPTION OF PREFERRED EMBODIMENTS

Figure 1:
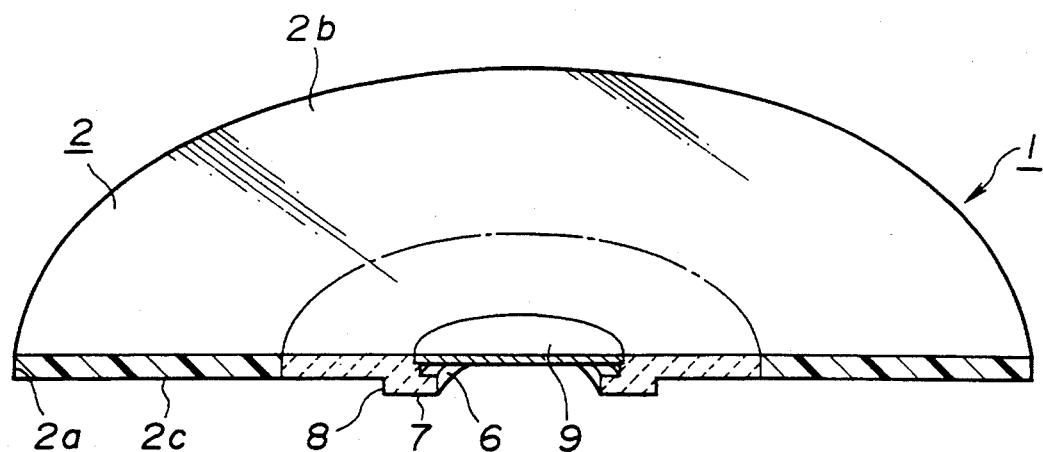
FIG. 1 is a perspective view showing an optical disc produced using a disc substrate obtained by molding a synthetic resin material, with a portion thereof being broken away.
Figure 2:
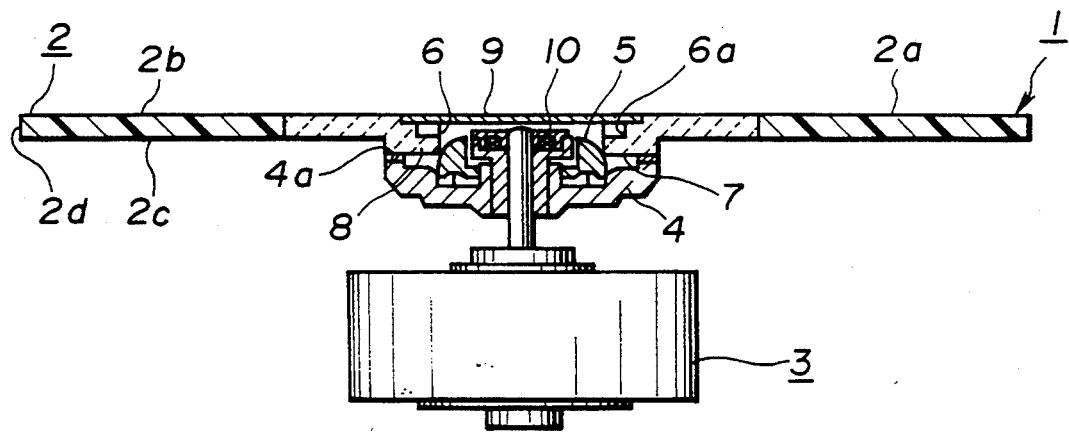
FIG. 2 is a cross-sectional view showing the state in which the optical disc is attached to a disc rotating and driving unit.
Figure 3:
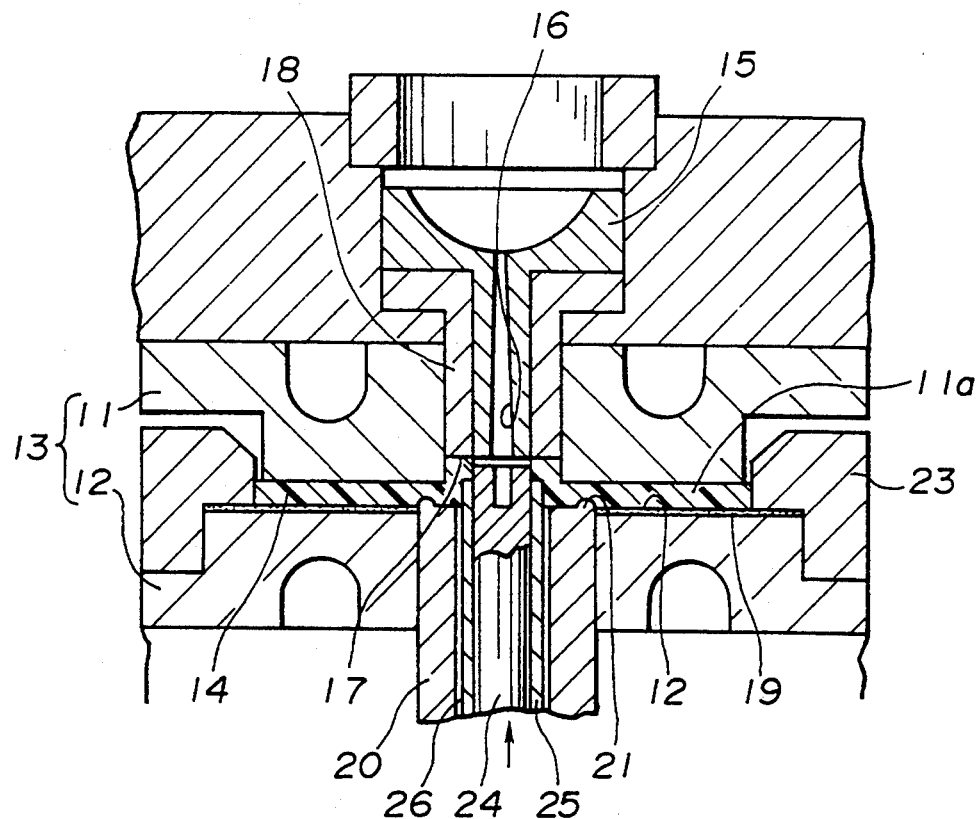
FIG. 3 is a schematic cross-sectional view showing a conventional metal mold device for molding a disc substrate.
Figure 4:
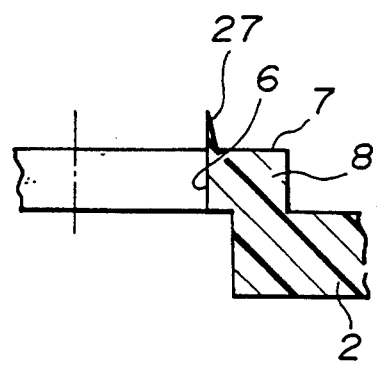
FIG. 4 is an enlarged partial cross-sectional view showing a raised portion of a disc substrate molded by the conventional metal mold device shown in FIG. 3.
Figure 5:
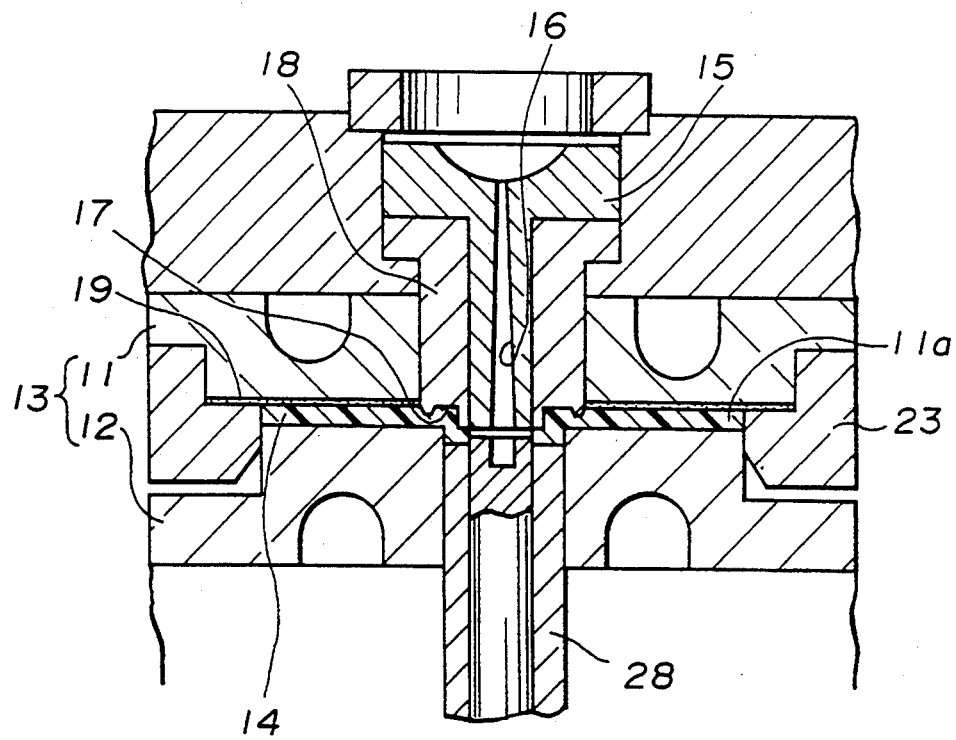
FIG. 5 is a schematic cross-sectional view showing another conventional metal mold device for molding a disc substrate.
Figure 6:
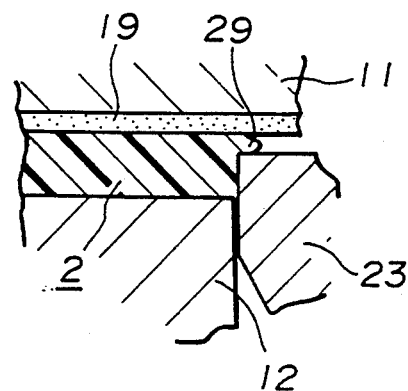
FIG. 6 is schematic cross-sectional view showing an outer peripheral portion of the disc substrate being molded by the conventional metal mold device shown in FIG. 5.

Referring to the drawings, a first embodiment of the metal mold device according to the present invention is explained.

Figure 7:
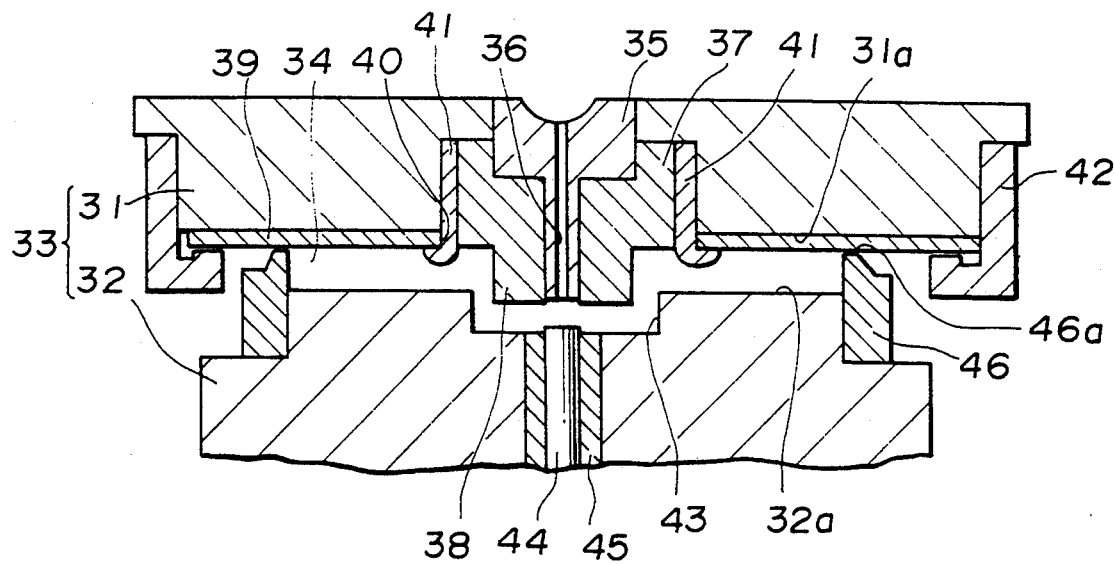
FIG. 7 is a schematic cross-sectional view showing a metal mold device for fabricating a disc substrate according to a first embodiment of the present invention.

The metal mold device includes a metal mold unit 33 made up of a fixed metal mold 31 and a movable metal mold 32 which is provided facing the fixed metal mold 31 and movably supported by a hydraulic device, not shown, for being moved towards and away from the fixed metal mold 31, as shown in FIG. 7. A mold cavity 34 corresponding in contour to the disc substrate 1 to be molded is defined between the fixed metal mold 31 and the movable metal mold 32 making up the metal mold unit 33.

The fixed metal mold 31 is provided with a sprue bushing 35, at the center of the mold cavity 34, for permitting synthetic resin, such as molten polycarbonate resin, supplied from an injection molding machine, not shown, to flow into the mold cavity 34. The sprue bushing 35 has a central resin injection opening 36, via which the molten synthetic resin, supplied from the injection molding machine, is injected and charged into the mold cavity 34.

On the outer periphery of the sprue bushing 35, there is fitted a holder support 37, in which there is fitted an inner peripheral stamper holder for supporting the inner periphery of a stamper to be described later. The distal side of the holder support 37 projected into the molding cavity 34 has a molding section 38 for shaping a raised portion 108 having substantially the same thickness as that of a main portion of the disc substrate 102a. The raised portion is formed integrally with a main portion of the disc substrate 102a on the opposite major surface 102c of the disc substrate 102.

On a molding surface 31a defining the mold cavity 34 of the fixed metal mold 12 is mounted a stamper 39 which is adapted for forming a pattern of micro-sized pits and lands corresponding to information signals recorded on the optical disc 1 or a number of pre-grooves defining recording track(s) formed on the signal recording section of the optical disc 1. The stamper 39 is loaded on the molding surface 31a of the fixed metal mold 31 by having the rim of a center opening 40 supported by an inner peripheral stamper holder 41 fitted into the holder support 37 and by having its outer periphery supported by an outer peripheral stamper holder 42 provided on an outer rim of the fixed metal mold 31.

At the center of a molding surface 32a of the movable metal mold 32 defining the mold cavity 34, there is formed a recess 43 for shaping the raised portion 108 on the opposite major surface 102c of the disc substrate 102 in cooperation with a mating projection 38 provided on the fixed metal mold 31. At the center of the recess 43, there is provided a perforating punch 44 of a perforating punching unit for punching an engaging opening 106 which is formed as a through-hole at the center of the raised portion 108. The punch 44 is provided in the movable metal mold 32 for being reciprocated within the sleeve 45.

Meanwhile, the sleeve 45 is supported for reciprocating movement with respect to the movable metal mold 32 for ejecting the as-molded disc substrate 102 from the movable metal mold A shaping member 46 for shaping an outer periphery of the disc, defining the outer periphery of the mold cavity 34 and adapted for shaping the outer periphery of the disc substrate 102 to be molded, is provided at an outer rim of the movable metal mold 32.

The shaping member 46 has a smooth abutment end surface 46a and is mounted radially inwardly of the outer peripheral stamper holder 42 mounted on the fixed metal mold 31. When the movable metal mold 32 is moved towards the fixed metal mold 31 by way of establishing a mold clamping state, the shaping member 46 has its smooth abutting and face 46a abutted on the stamper 39 for sealing the mold cavity 34, so that it becomes possible to eliminate any voice space or the outer rim of the mold cavity 34, into which molten resin charged into the mold cavity 34 may be intruded, to prevent burrs etc. from being produced on the outer rim of the disc substrate 102.

A molding surface 32a of the movable metal mold 32 is a smooth mirror surface to permit molding of the opposite major surface 2c of the disc substrate 2 which is to be a light beam incident surface.

Figure 8:
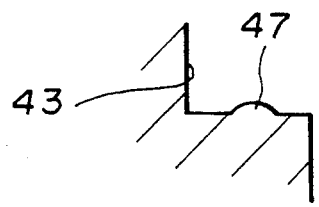
FIG. 8 is a partial cross-sectional view showing an engaging boss as mold releasing resisting means on the inner periphery of a recess for shaping the raised portion.
Figure 9:
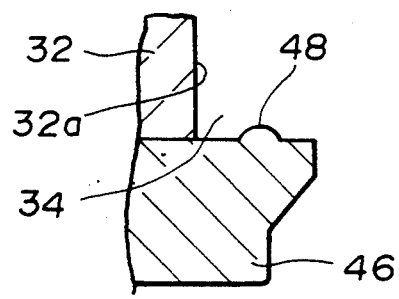
FIG. 9 is a partial cross-sectional view showing an engaging boss as mold releasing resisting means on the inner peripheral surface of a shaping member for shaping an outer peripheral portion of the disc.

An engaging boss 47 projected into engagement with the outer peripheral surface of the raised portion 108 on the opposite major surface 102c of the disc substrate 103 being molded is formed on an inner peripheral surface of the recess 43 formed on the movable metal mold 32, as shown in FIG. 8. That is, the engaging boss 47 plays the role of a releasing resisting means by being engaged with the outer peripheral surface of the raised portion 108 of the as-molded disc substrate 102 for holding the as-molded disc substrate on opening the mold after termination of molding for moving the movable metal mold 32 in a direction of disengaging the movable metal mold 92 away from the fixed metal mold 31. A plurality of such engaging bosses may be provided at preset intervals on the inner peripheral surface of the recess 43, or alternatively, only a single such engaging boss may be provided in a ring shape.

It is noted that the engaging boss 47 is provided on an inner peripheral surface of the recess 49 at a spacing from the bottom surface of the recess 43 which does not affect the molding of the loading reference surface 107 formed at an end face of the raised portion 108 of the disc substrate 102.

Meanwhile, an engaging boss 48 projected into engagement with the outer peripheral surface 102d of the main portion 102a of the disc substrate 102 being molded is similarly formed on the inner peripheral surface of the shaping member 46 directed towards the mold cavity 34. The engaging boss 48 plays the role of a releasing resisting means for holding the as-molded disc substrate by the movable metal mold 32 on opening the mold after termination of molding. A plurality of such engaging bosses may be provided at preset intervals on the inner peripheral surface of the molding member 46, or alternatively, only a single such engaging boss may be provided in a ring shape.

For molding the disc substrate 102, using the above-described metal mold device, the movable metal mold 92 is caused to approach the fixed metal mold 31 for establishing a mold clamping state. In this mold clamping state, molten synthetic resin, such as molten polycarbonate resin, supplied from an injection molding machine, not shown, is injected and charged into the mold cavity 34 via resin injection opening 96 in the sprue bushing 35. The movable metal mold 92 is moved towards the fixed metal mold 31 for compressing the synthetic resin charged into the mold cavity 94, by way of carrying out mold clamping. The synthetic resin thus compressed is then allowed to cool for producing the disc substrate 102 corresponding in contour to the mold cavity 34.

Meanwhile, during molding of the synthetic material, the engaging boss 47 on the inner peripheral surface of the recess 43 is engaged with the outer peripheral surface of the raised portion 108 of the disc substrate 102 being molded, while the engaging boss 48 on the inner peripheral surface of the shaping member 46 directed towards the mold cavity 24 is engaged with the outer peripheral surface 102d of the main portion of the substrate 102a. If the movable metal mold 92 is moved away from the fixed metal mold 31, by way of carrying out a mold opening operation, the as-molded disc substrate 102 is held by the engaging bosses 47, 48, so as to be moved along with the movable mold 32 for being released from the stamper mounted on the fixed metal mold 31.

Consequently, the height and size of the engaging bosses 47, 48 are set so as to have a mold release resistance larger than the mold release resistance offered to the disc substrate 102 by the stamper 39 provided on the fixed metal mold. By providing the engaging bosses 47, 48, the as-molded disc substrate 102 may be positively released (viz., separated) from the stamper 39 so as to be moved towards the movable metal mold 32 not provided with the stamper 39.

Figure 10:
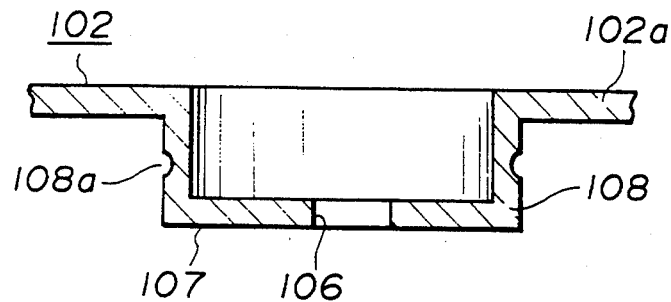
FIG. 10 is a partial cross-sectional view showing a raised portion of a disc substrate fabricated by the metal mold device shown in FIG. 7.

The disc substrate 102, molded by the metal mold device provided with the engaging bosses 47, 48, has a groove 108a as a mating mold release resisting means, operatively associated with the engaging boss 48 provided on the shaping member 46 for shaping the outer periphery of the disc, as shown in FIG. 10. The groove 108a is formed on the outer peripheral surface of the raised portion 108 so that the loading reference surface 107, which needs to be shaped as a smooth surface to higher accuracy, can be shaped highly smoothly without producing burrs.

Figure 11:
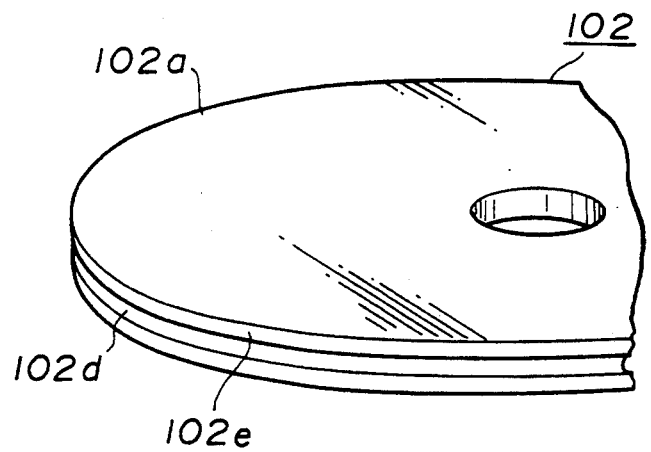
FIG. 11 is a partial perspective view showing an outer peripheral part of a main portion of the disc substrate fabricated by the metal mold device shown in FIG. 7.

On the other hand, the main portion of the disc substrate 102a of the disc substrate 102 has a recess 102e as a mating mold releasing resistance operatively associated with the engaging boss 48 of the shaping member 46. The recess 102e is formed on the outer peripheral end face 102d of the main portion 102a of the substrate 102 free of the signal recording section without affecting the main portion 102a provided with the signal recording section, as shown in FIG. 11.

Figure 12:
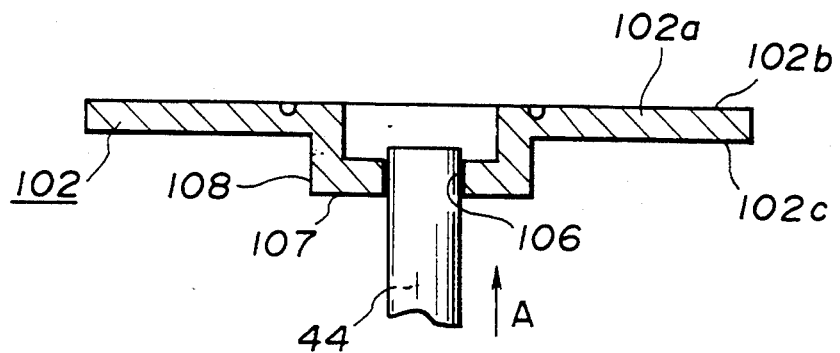
FIG. 12 is a schematic cross-sectional view showing the state in which an engaging opening is perforated in the raised portion of the disc substrate by a perforating punch provided in the metal mold device shown in FIG. 7.

Besides, with the metal mold device shown in FIG. 7, since the perforating punch 44 is arranged at the movable metal mold 32 having the recess 43 for shaping the loading reference surface 107 provided at the distal end face of the raised portion 108, the perforating punch 44 is projected from the loading reference surface 107 in a direction as shown by arrow A in FIG. 12 for perforating the engaging opening 106 at the center of the raised portion 108. Consequently, the loading reference surface 107 may be formed to a highly smooth surface, without punching burrs otherwise produced on the surface 107 due to the perforating punch 44, to permit the rim of the engaging opening 106 engaged by the centering member 105 to be molded with high accuracy.

Although the engaging bosses 47, 48 are provided in the above-described first embodiment on tile inner peripheral surface of the recess 43 for molding the raised portion and on the inner peripheral surface of the shaping member 46 for molding the outer rim of the disc,it suffices to provide only one of these bosses 47, 48 as long as the required separation from the fixed metal mold and the stamper 49, is achieved.

Figure 13:
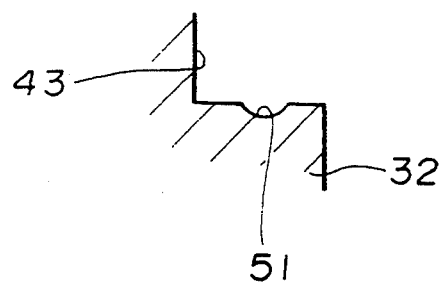
FIG. 13 is a partial cross-sectional view showing another example of a metal mold releasing means formed on the inner peripheral surface of the recess for shaping the raised portion of the disc substrate.
Figure 14:
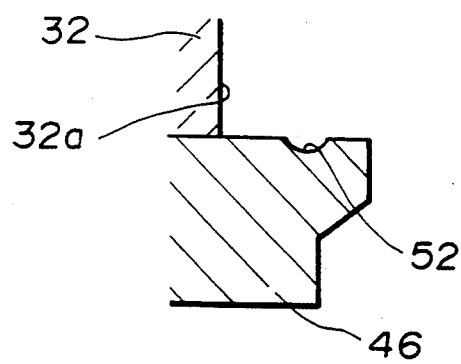
FIG. 14 is a partial cross-sectional view showing still another example of a metal mold releasing resisting means formed on the inner peripheral surface of the shaping member for shaping the outer peripheral surface of the disc substrate.

Although the engaging bosses 47, 48 are provided in the above-described first embodiment as the mold releasing resisting means on the inner peripheral surface of the recess 43 and on the inner peripheral surface of the shaping member 46, it suffices if resistance to mold releasing is produced at the time of release of the as-molded disc substrate 102 from the metal mold device. Thus it is possible to provide an engaging recess 51 engaged by a corresponding boss on the outer periphery of the raised portion 108 of the disc substrate 102, as shown in FIG. 13, and to provide an engaging recess 52 engaged by a corresponding boss on the outer periphery of the main portion of the disc substrate 102a on the inner peripheral surface of the molding member 46, as shown in FIG. 14.

It is also possible to provide the engaging recess 51 on the inner peripheral surface of the recess 43 and to provide the engaging boss 48 on the inner peripheral surface of the shaping member 46, while it is similarly possible to provide the engaging boss 47 on the inner peripheral surface of the recess 43 and to provide the engaging recess 52 on the inner peripheral surface of the molding member 46.

Besides, in the metal mold device, shown in FIG. 7, the shaping member 46 is arranged at the movable metal mold 32, and the engaging boss 48 or the engaging recess 52, acting as the mold release resisting means, is formed on the inner peripheral surface of the molding member 46. However, the molding member for molding the outer peripheral surface of the disc substrate 102 may be formed on an outer peripheral stamper holder 42 provided on the fixed metal mold 31 for supporting the outer rim of the stamper 39, as shown in FIG. 15.

Figure 15:
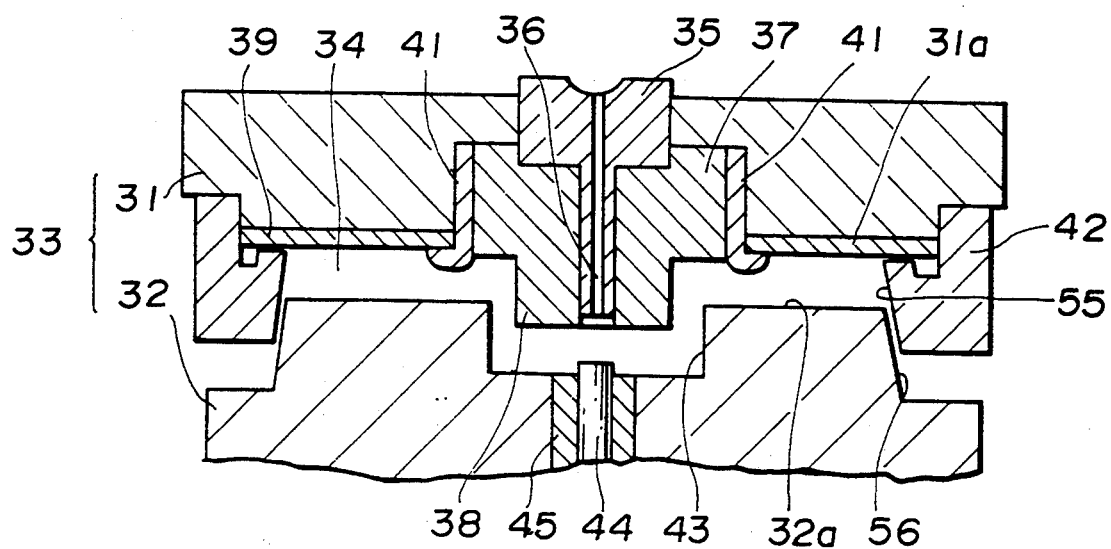
FIG. 15 is a schematic cross-sectional view showing a second embodiment of the metal mold device for fabricating a disc substrate according to the present invention.

With the above-described metal mold device, the outer peripheral stamper holder 42 has an inner peripheral surface 55, defining the outer periphery of the mold cavity 94 and adapted for molding the outer peripheral surface of the mold cavity 34, as a tapered surface which is increased in diameter in a direction towards the movable metal mold 92, as shown in FIG. 15. On the other hand, the movable metal mold 32 has an outer peripheral surface 56, engaged with an outer peripheral stamper holder 42 during molding of the disc substrate 102, as a tapered surface which is tapered towards its distal end face, for mating with the inner peripheral surface of the outer peripheral stamper holder 42. The mold cavity 34 for molding the disc has its outer peripheral side as a tapered surface tapered from the movable metal mold 22 towards the fixed metal mold 31.

Figure 16:
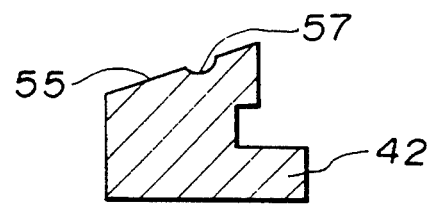
FIG. 16 is a partial cross-sectional view showing a metal mold releasing resisting means formed on the inner peripheral surface of an outer peripheral stamper holder of the metal mold device shown in FIG. 15.

An engaging recess 57 engaged with a corresponding boss on the outer periphery of the main portion of the substrate 102a for increasing the mold release resistance at the time of releasing the as-molded disc substrate 102 from the mold device is formed on an inner peripheral surface 55 of the outer peripheral stamper holder 42 adapted for molding the outer periphery of the disc substrate 102, as shown in FIG. 16.

With the metal mold device, shown in FIG. 15, when the movable metal mold 32 is moved away from the fixed metal mold 31 by way of a mold opening operation, the as-molded disc 102 is held by the engaging boss 47 and the engaging recess 57, while being prevented by the tapered mold cavity 34 from being moved towards the fixed metal mold 31 fitted with the stamper 39, so that the as-molded disc substrate 102 is released from the stamper 39 so as to follow the movable metal mold 32. In each of the above-described embodiments, the fixed metal mold 31 fitted with the stamper 39 is provided with a sprue bushing 35 having the resin injection nozzle 36, and a molding section 38 for shaping the raised portion 108 having the loading reference surface 107 on its end face projected towards the opposite major surface 102c of the disc substrate 102 is provided at the distal end face of the sprue bushing 35. The result is that the sprue bushing 35 is elongated in size to prolong the communication passage of the molten synthetic resin material to render it difficult to inject molten resin smoothly into the mold cavity 34.

Figure 17:
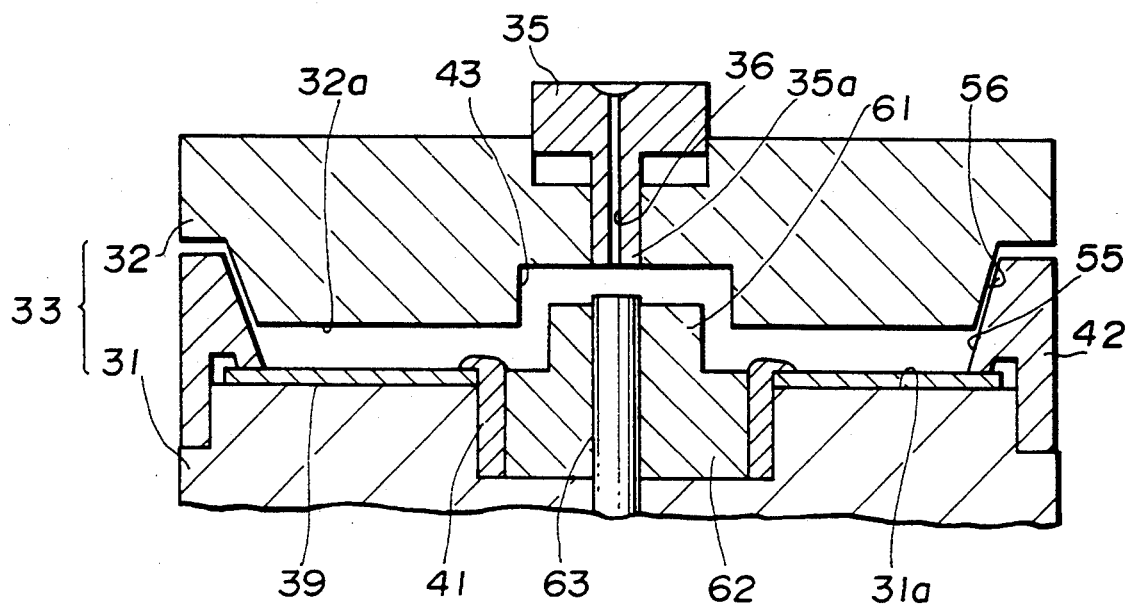
FIG. 17 is a schematic cross-sectional view showing a third embodiment of the metal mold device for fabricating a disc substrate according to the present invention.

For obviating such an inconvenience, the sprue bushing 35 is provided on the movable metal mold 32, as shown in FIG. 17. The recess 43 for shaping the raised portion 108 on the opposite major surface 102c of the disc substrate 102 is formed in the portion of the movable metal mold 32 faced by the distal end of the sprue bushing 35.

By providing the movable metal mold 32 with the sprue bushing 35 in this manner, the sprue bushing 35 may be reduced in size as compared to the sprue bushing provided in the metal mold device of the preceding embodiments.

Meanwhile, with the metal mold device shown in FIG. 17, the sprue bushing 35 is movable with respect to the movable metal mold 32, and an end part 35a of the sprue bushing 35 is used as a perforating punch for punching the engaging opening 6 which is to be formed as a through-hole at the center of the raises portion 108.

The fixed metal mold 31 is provided with an insert 62 having a projection 61 projected towers the opposite major surface 102c of the disc substrate 102 for shaping the raised portion 108 in cooperation with the recess 43 of the movable metal mold 32. A receiving member 63 for receiving the sprue bushing 35 moved for punching the engaging opening 106 is provided at the portion of the projection 61 adapted for molding the raised portion 108.

The stamper 39 is loaded on the molding surface 31a of the fixed metal mold 31 by having the rim of its center aperture 40 supported by an inner peripheral stamper holder 41 fitted on the outer peripheral side of the insert 62 and by having the outer rim supported by the outer peripheral stamper holder 42 provided on the outer peripheral side of the outer peripheral side of the fixed metal mold 31, in the same manner as in the preceding embodiments.

In the present metal mold device, an engaging boss 47 adapted for being engaged with a corresponding recess in the outer peripheral surface of the raised portion 108 of the as-molded disc substrate 102 is formed on the inner peripheral surface of the recess 43 in the movable metal mold 32, while an engaging recess 57 adapted for being engaged with a corresponding boss on the outer peripheral surface of the main portion of the disc substrate 102a is formed in the inner peripheral surface 55 of the outer peripheral stamper holder 42, in the same manner as in the metal mold device shown in FIG. 15.

Although the stamper 49 is provided at the fixed metal mold and the perforating punch is provided at the movable metal mold, this arrangement may be reversed, that is, the stamper and the perforating punch may also be provided at the movable metal mold and the fixed metal mold, respectively.

A second embodiment of the metal mold device for molding the disc substrate according to the present invention will be explained by referring to the drawings.

Figure 18:
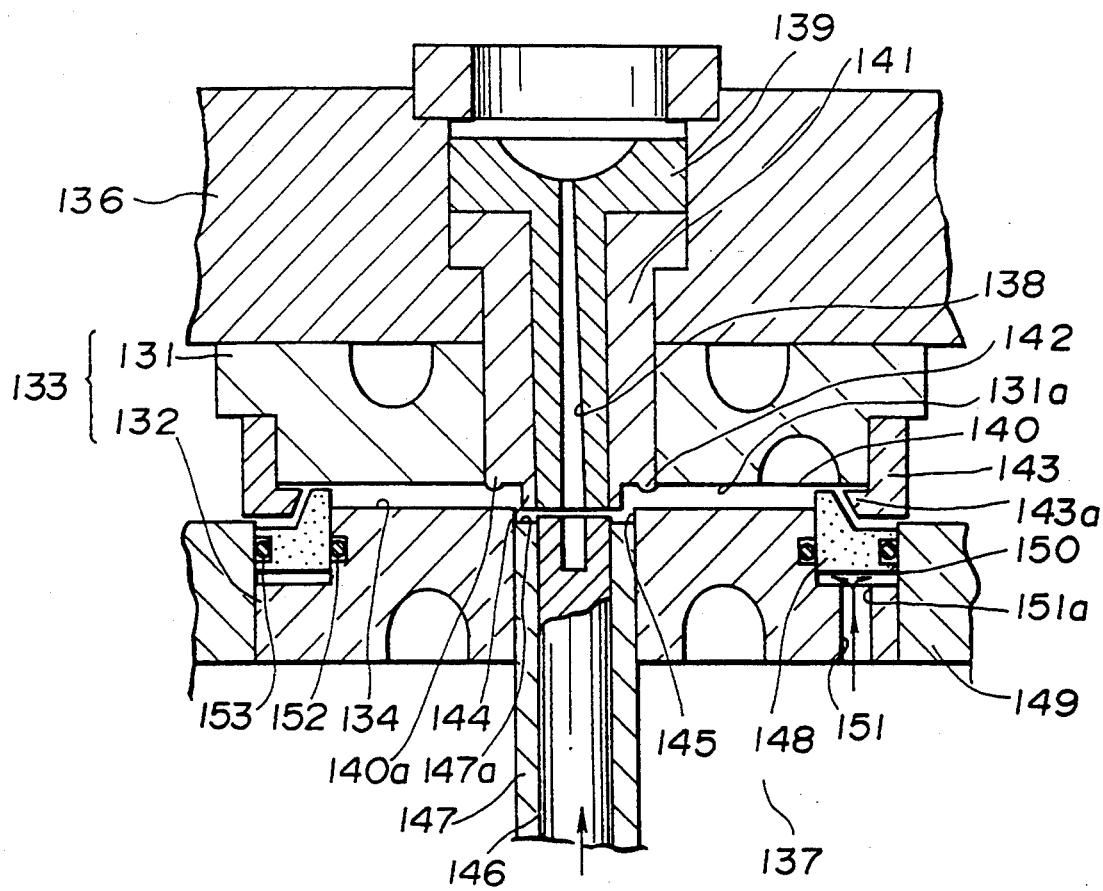
FIG. 18 is a schematic cross-sectional view showing a fourth embodiment of the metal mold device for fabricating a disc substrate according to the present invention.

The molding device for molding the disc substrate includes a metal mold unit 133 made up of a fixed metal mold 131 and a movable metal mold 132 facing the fixed metal mold, as shown in FIG. 18. A mold cavity 134, corresponding in profile to a disc substrate 201 to be molded, is defined between the fixed metal mold 131 and the movable metal mold 132, as will be explained subsequently.

Meanwhile, the fixed metal mold 131 is supported on a fixed mounting base 136 by mounting means, not shown. On the other hand, the movable metal mold 132, moved in a direction towards and away from the fixed metal mold 131, is supported by mounting means, not shown, on a movable mounting base 137 driven by driving means, such as hydraulic driving means, also not shown.

The fixed metal mold 131 includes, at the center of a mold cavity 134, a sprue bushing 139 having an injection opening 138 for injecting molten resin, such as polycarbonate resin, supplied from an injection molding machine, not shown, into the mold cavity 134. The molten synthetic resin, supplied from the injection molding machine, is injected into the mold cavity 134 via injection opening 138.

On a molding surface 131a of the fixed metal mold 131 defining the mold cavity 134 is mounted a stamper 140 for forming a pattern of pits and lands corresponding to information signals to be recorded on an optical disc 201, or a series of pregrooves delimiting a recording track(s) of the optical disc 201. The stamper 140 is in the form of a disk having a center aperture 140a.

On the outer periphery of a sprue bushing 139, arranged at the center of the fixed metal mold 131, is fitted a stamper holder 141 for supporting the stamper 140 in position. The distal end side of the stamper holder 141 projected towards the mold cavity 134 has a projection 142 adapted for being received in a center aperture 140a of the stamper 140. The projection 142 is in the form of a cylinder having an outside diameter substantially equal to the diameter of the center aperture 140a of the stamper 140 so that the projection may be engaged with a tight fit in the center aperture 140a. That is, the outer periphery of the projection 142 becomes the loading position setting surface for setting the loading position of the stamper 140 fitted on the fixed metal mold 131. That is, the stamper 140 is loaded with correct centering on the fixed metal mold 131 by having its center aperture 140a engaged by the projection 142.

On the other hand, the stamper 140 is supported in intimate contact with the molding surface 131a of the fixed metal mold 131 by having its outer peripheral surface supported by stamper holding section 143a of an outer peripheral stamper holder 143 provided on the outer periphery of the fixed metal mold 131.

Figure 26:
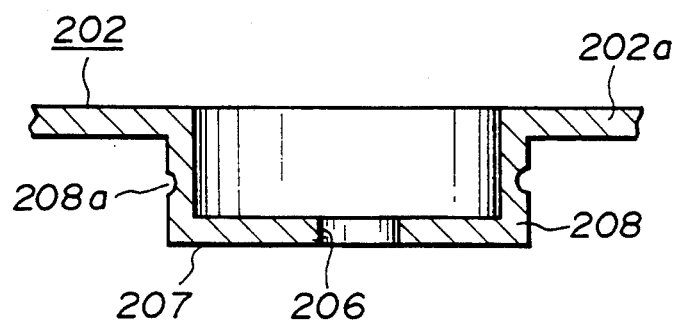
FIG. 26 is a partial cross-sectional view showing a raised portion of a disc substrate fabricated by the metal mold device shown in FIG. 18.
Figure 27:
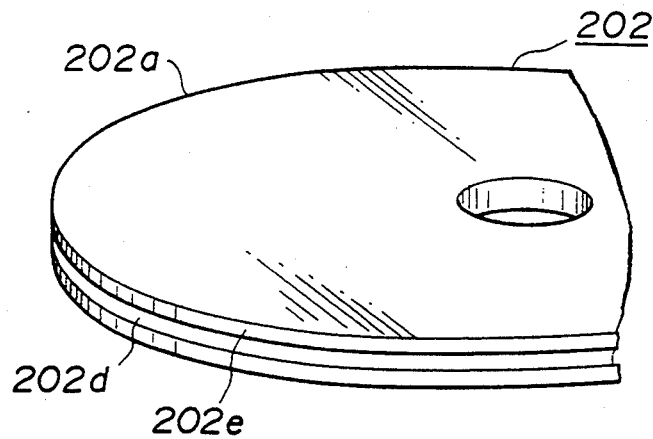
FIG. 27 is a partial perspective view showing an outer peripheral part of a main portion of the disc substrate fabricated by the metal mold device shown in FIG. 18.

Meanwhile, the distal end side of the stamper holder 141, projected into the mold cavity 134, has a shaping section 144 for shaping a raised portion 208 projected towards the opposite major surface 202c of the disc substrate 202 with a thickness approximately equal to the thickness of the main portion of the substrate 202a and having a loading reference surface 207 on its distal end side, as shown in FIGS. 26 and 27.

At the center of a molding surface 132a of the movable metal mold 132 defining the mold cavity 134 of the movable metal mold 132 is formed a recess 145 for shaping the raised portion 208 on the opposite major surface of the disc substrate 202 in cooperation with the molding section 208 on the opposite major surface of the disc substrate 202. A perforating punch 146 for punching an engaging opening 206 formed as a throughhole at the center of the raised portion 208 is mounted at the center of the recess 145 designated to form the raised portion 208. The perforating punch 146 is reciprocated within a sleeve 147 having a loading reference surface shaping surface 147a on its distal end for shaping the loading reference surface 207 at the distal end of the raised portion 208.

Meanwhile, the sleeve 147 is supported for reciprocating movement by the movable metal mold 132 for ejecting the as-molded disc substrate 202 out of the movable metal mold 132.

An annular sliding member 148 defining the outer periphery of the mold cavity 124 and adapted for shaping the outer peripheral side 202d of the disc substrate 202 to be molded is mounted on the outer peripheral side of the movable metal mold 132.

The sliding member 148 is mounted for reciprocating movement in a housing space 150 defined by a step on the outer periphery of the movable metal mold 132 and a holding member 149 mounted on an outer peripheral side of the movable metal mold 132 for surrounding the movable metal mold 132. The sliding member 148 is adapted for being moved relative to the movable metal mold 132 in a direction towards the movable metal mold 132 by compressed air supplied via an air passage 151 formed in the movable metal mold 132 so as to be opened at 51a towards the bottom surface of the housing space 150.

Meanwhile, sealing 0-rings 152, 153 are provided on the inner peripheral surface of the housing space 150 towards the movable metal mold 132 and the outer peripheral surface of the sliding member 148 for hermetically sealing the housing space 150 to inhibit air leakage.

Figure 19:
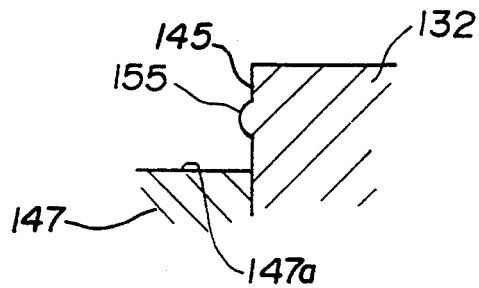
FIG. 19 is a partial cross-sectional view showing an engaging boss as mold releasing resisting means formed on the inner peripheral surface of a recess of the metal mold device of FIG. 18 for shaping the raised portion of the disc substrate.

On the inner peripheral surface of the recess 145 of the movable metal mold 132 is formed an engaging boss 155 adapted for being engaged with the outer peripheral surface of the raised portion 208 on the opposite major surface 202c of the disc substrate 202 to be molded, as shown in FIG. 19. The engaging boss 155 is to be a mold releasing resisting means by being engaged with the outer peripheral surface of the raised portion 208 of the disc substrate 202 at the time of mold opening of moving the movable mold 132 away from the fixed metal mold 131 after the end of molding for holding the as-molded disc substrate 202 by tile movable metal mold 132. The engaging boss 155 is provided in a ring shape on the inner peripheral surface of the recess 145 or a plurality of such engaging bosses are provided at a predetermined interval on the inner peripheral surface of the recess 145.

Meanwhile, the engaging boss(es) 155 are provided on the inner peripheral surface of the recess 145 at a suitable distance from the bottom thereof so as not to affect the operation of shaping of the loading reference surface 207 to be formed on the distal end face of the raised portion 208 of the disc substrate 202.

Figure 20:
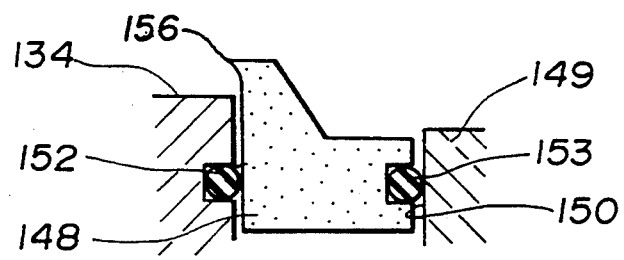
FIG. 20 is a partial cross-sectional view showing an engaging boss as mold releasing resisting means formed on the sliding member of the metal mold device of FIG. 18 for shaping the raised portion of the disc substrate.
Figure 21:
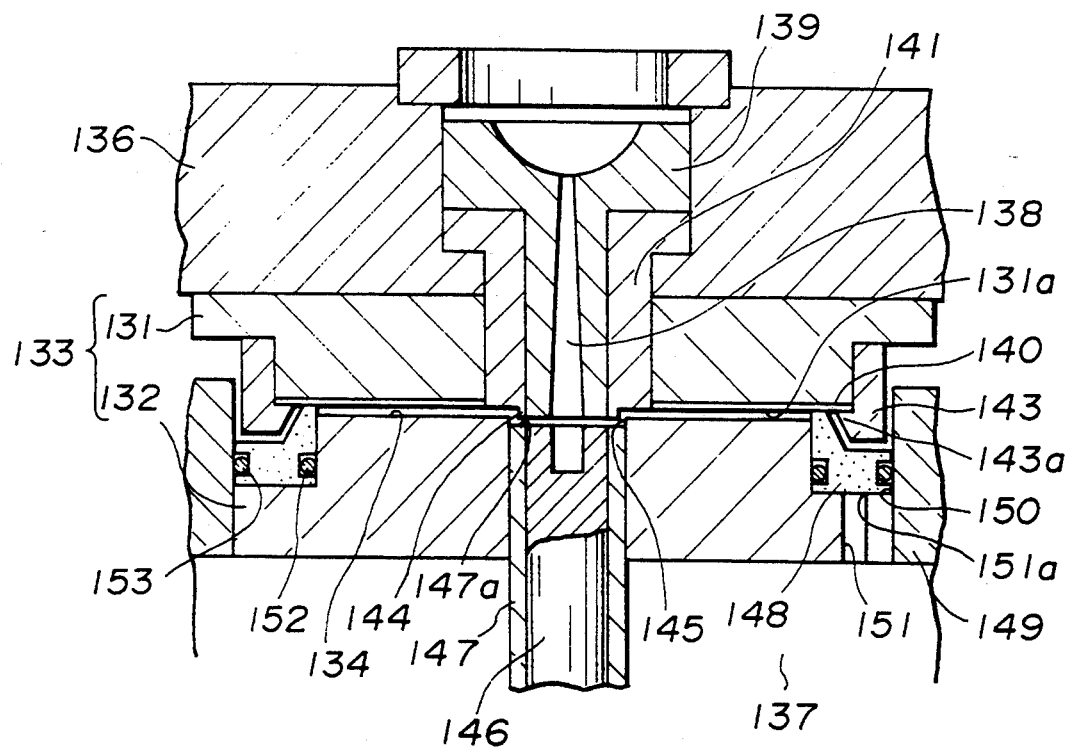
FIG. 21 is a schematic cross-sectional view of the metal mold device shown in FIG. 18, showing the mold clamping state in which the movable metal mold has been moved towards the fixed metal mold device.

On the distal end side of the sliding member 148, directed towards the mold cavity 134, there is also formed an engaging boss 156 which is projected towards the outer peripheral surface 202d of the main portion 202a of the disc substrate 202 to be molded so as to be used as a mold releasing resistance for holding the as-molded disc substrate 202 by the movable metal mold 132 when the metal mold device is opened after the end of molding, as shown in FIG. 20. The engaging boss 156 is provided in a ring shape on the inner peripheral surface 148a of the sliding member 148 or a plurality of such engaging bosses are provided at a predetermined interval on the inner peripheral surface 148a of the sliding member 148.

For molding the disc substrate 202 using the above-described metal mold device, the movable metal mold 132 is caused to approach to the fixed metal mold 131 for establishing a mold clamping state. When the mold clamping state is established, compressed air is supplied via a passage 151 into the housing space 150 for intruding the sliding member 148 towards the fixed metal mold 121.

Figure 22:
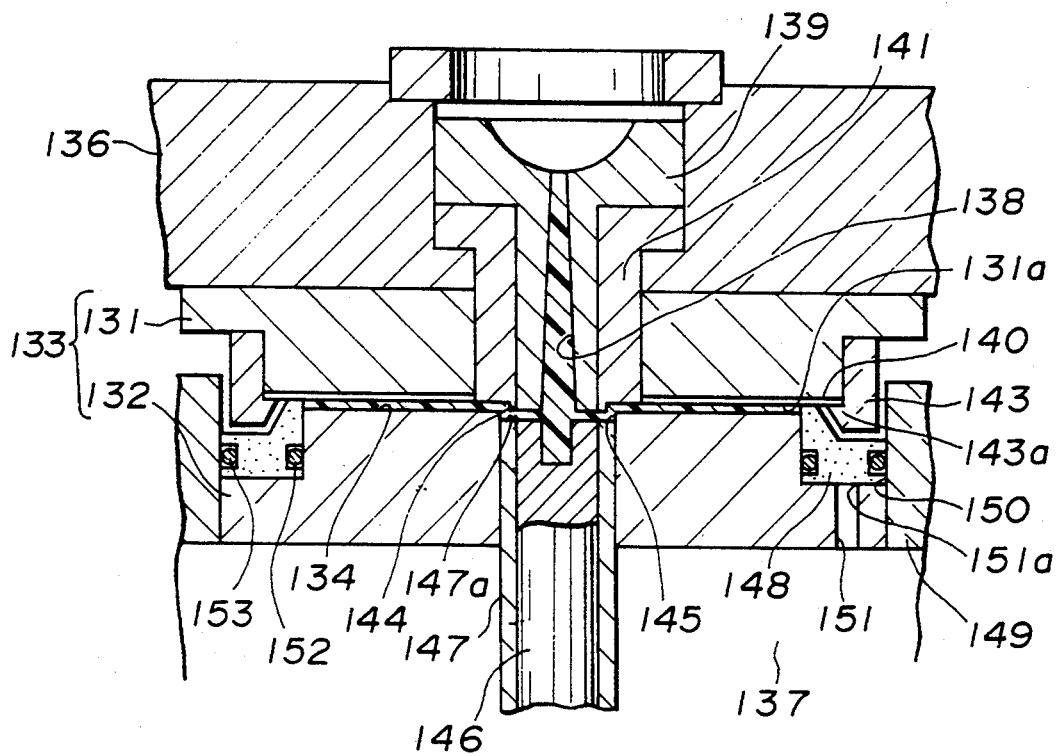
FIG. 22 is a schematic cross-sectional view of the metal mold device shown in FIG. 18, showing the state in which the synthetic resin is injected into a mold cavity.
Figure 23:
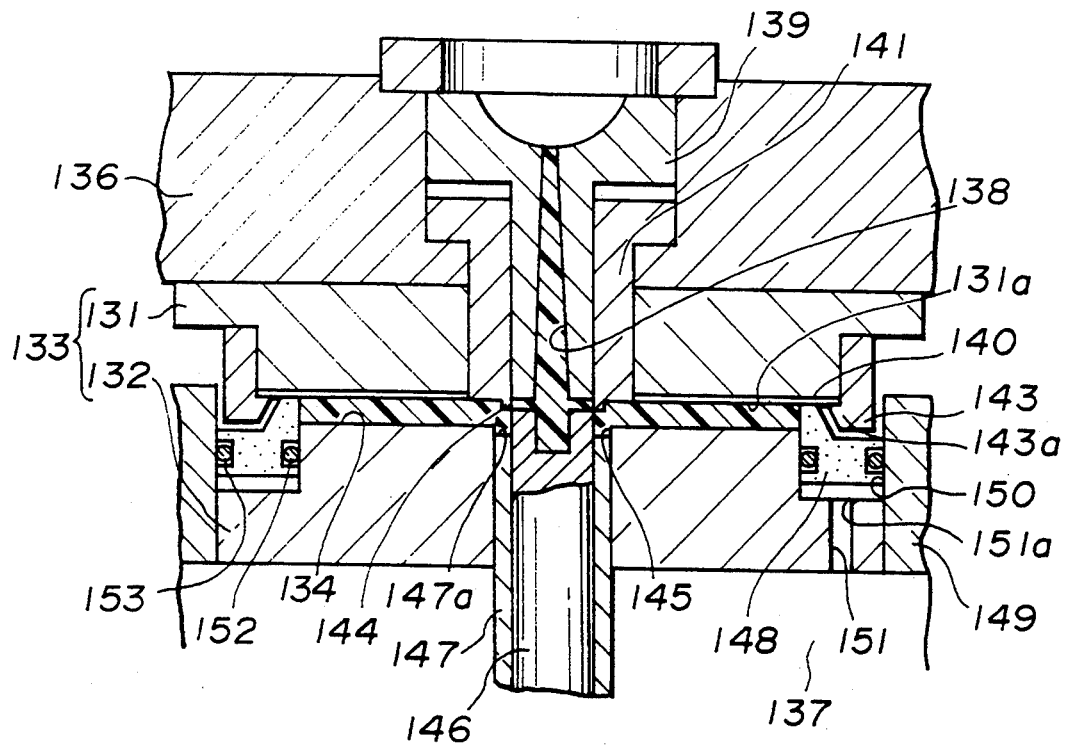
FIG. 23 is a schematic cross-sectional view of the metal mold device shown in FIG. 18, showing the state in which the synthetic resin is charged into the mold cavity.

In the above-mentioned mold clamping state, molten synthetic resin, such as molten polycarbonate resin, supplied from an injection molding machine, not shown, is injected and charged into the mold cavity 134 via injection opening 138 of the sprue bushing 139, as shown in FIG. 22. After charging the synthetic resin into the mold cavity 134, the movable metal mold 132 is moved in a direction away from the fixed metal mold 131 under the pressure exerted by the charged resin. The sliding member 148, biased under the force of the compressed air towards the fixed metal mold 121, is moved relative to the movable metal mold 132 into pressure contact with the surface of the stamper 140 as provided on the fixed metal mold 131, as shown in FIG. 23.

After the end of charging of the synthetic resin material into the mold cavity 134, the perforating punch 147 is moved for punching an engaging opening 206 at the center of the raised portion 208.

It is noted that the sliding member 148 has a planar upper abutting surface 148a for abutment against the stamper 140, any void by which part of the molten synthetic material may be intruded into a space between the sliding member 148 and the stamper 140 may be eliminated when the abutting surface 148a abuts on the stamper 140 to prevent burrs from being produced on the outer periphery of the disc substrate 202.

Figure 24:
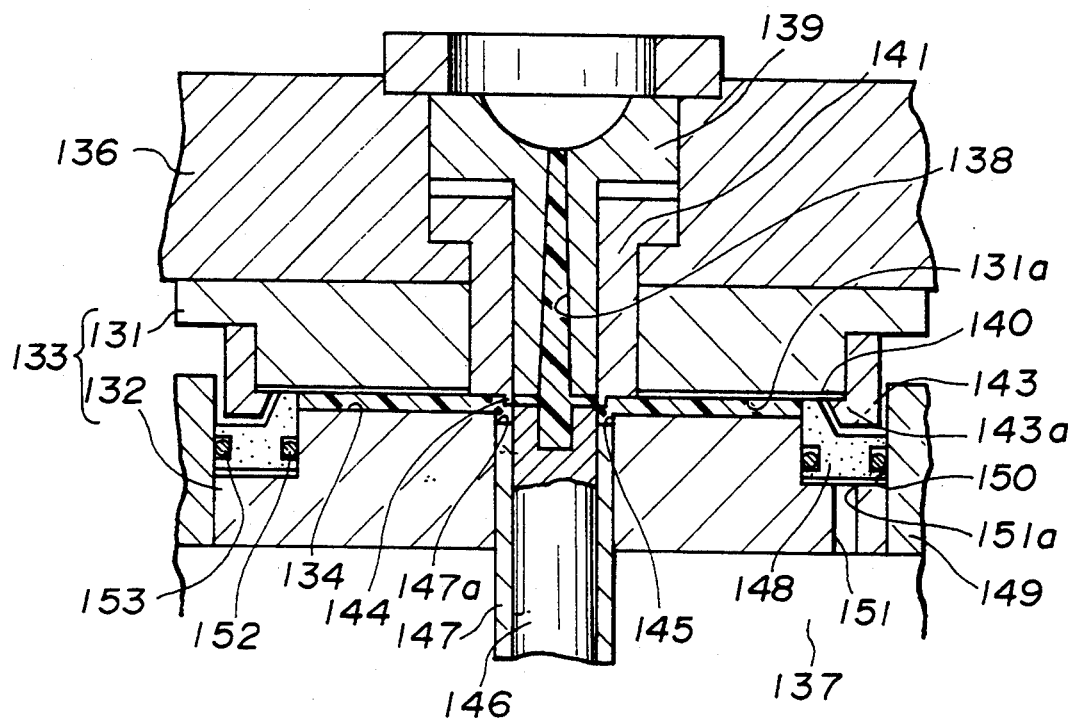
FIG. 24 is a schematic cross-sectional view of the metal mold device shown in FIG. 18, showing the state in which the synthetic resin is charged into and compressed in the mold cavity.

After charging the synthetic resin into the mold cavity 134 as described above, the movable metal mold 132 is again moved towards the fixed metal mold 131, as shown in FIG. 24, by way of a mold clamping operation for compressing the resin charged into the mold cavity 134 by preventing sink etc. from being produced on the as-molded disc substrate 202.

Figure 25:
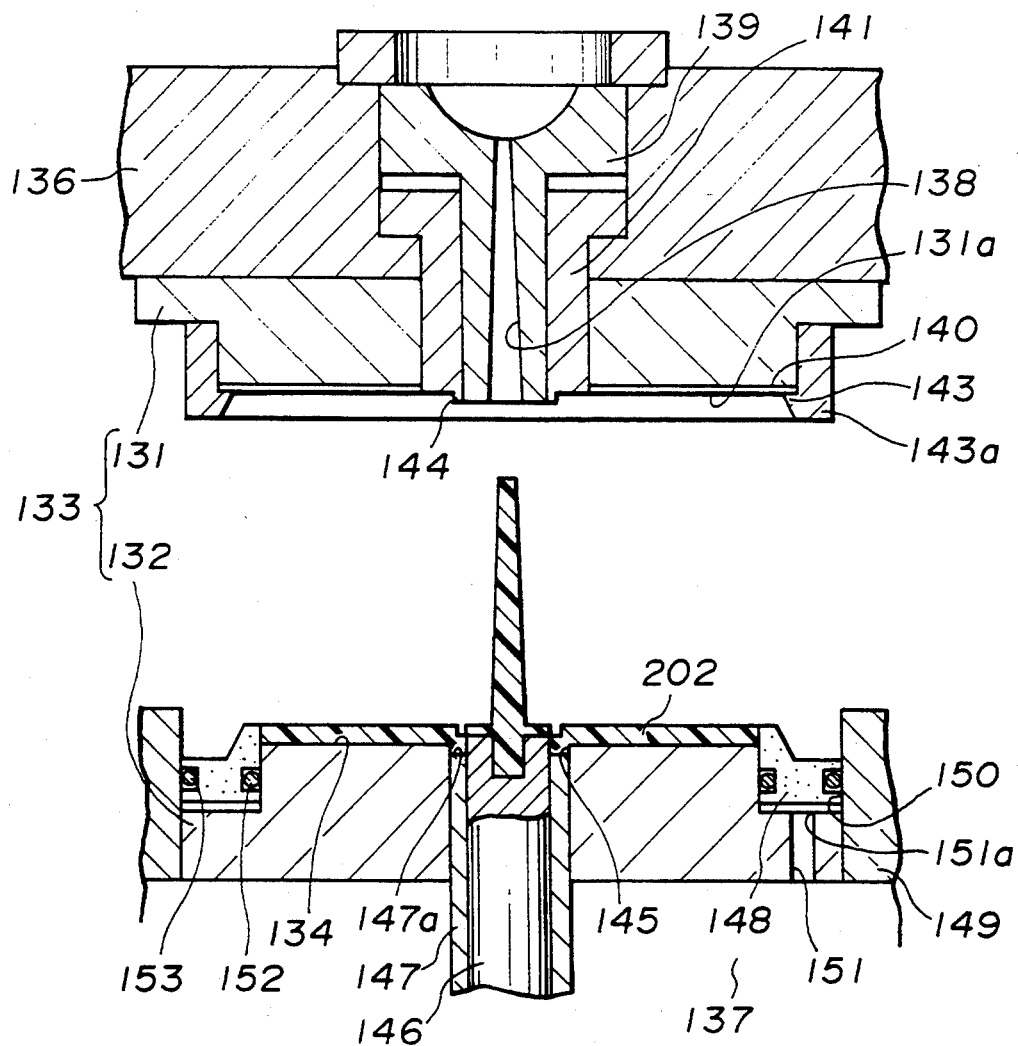
FIG. 25 is a schematic cross-sectional view of the metal mold device shown in FIG. 18, showing the mold opening state in which the movable mold is moved away from the fixed metal mold.

The metal mold unit 133 is allowed to cool to harden the as-molded disc substrate 202. The movable metal mold 132 is separated away from the fixed metal mold 131 by way of a mol opening operation to complete the molding of the disc substrate 202, as shown in FIG. 25.

Meanwhile, the sleeve 147 is protruded in the direction of the mold cavity 134 at the time of mold opening for releasing the as-molded disc substrate 202 from the movable mold 132, so that the disc substrate 202 may be taken out of the metal mold unit 133 by a takeout unit, not shown.

Meanwhile, when molding the synthetic material, the engaging boss 155 on the inner peripheral surface of the recess 145 on the movable metal mold 132 is engaged with the outer peripheral surface of the raised portion 208 of the as-molded disc substrate 202, while the engaging boss 156 on the inner peripheral surface 148a of the sliding member 148 directed towards the mold cavity 124 is engaged with the outer peripheral surface 202d of the main portion of the disc substrate 202a. If the movable metal mold 132 is moved in the direction away from the fixed metal mold 131 by way of performing the metal opening operation, the as-molded disc substrate 202 is held by the engaging bosses 155, 156 so as to be released from the stamper surface of the stamper mounted on the fixed metal mold 121 in unison with the movable metal mold 122.

To this effect, the engaging bosses 155, 156 are designed as to size and height so that a larger mold releasing resistance than the mold releasing resistance offered by the stamper to the disc substrate 202 is produced by the engaging bosses 155, 156. By setting the engaging bosses 155, 156 in this manner, it becomes possible to release the as-molded disc substrate 202 positively from the stamper 140 so as to be moved towards the movable metal mold 122 not provided with the stamper 129.

The disc substrate 202, molded by the metal mold device provided with the engaging bosses 155,156, has a groove 208a on the raised portion 208 as a mating mold release resisting means operatively associated with the engaging boss 155 as shown in FIG. 26. The groove 208a is formed on the outer peripheral surface of the raised portion 208 so that the loading reference surface 207, which needs to be shaped as a smooth surface, can be shaped highly smoothly without producing burrs.

On the other hand, the main portion of the disc substrate 202a of the disc substrate 202 has a recess 202d as a mold releasing resisting means operatively associated with the engaging boss 56 of the molding member 148. The recess 202d is formed on the outer peripheral surface of the main portion 202a of the substrate 202 free of the signal recording section so as not to affect the main portion 202a provided with the signal recording section, as shown in FIG. 27.

Figure 28:
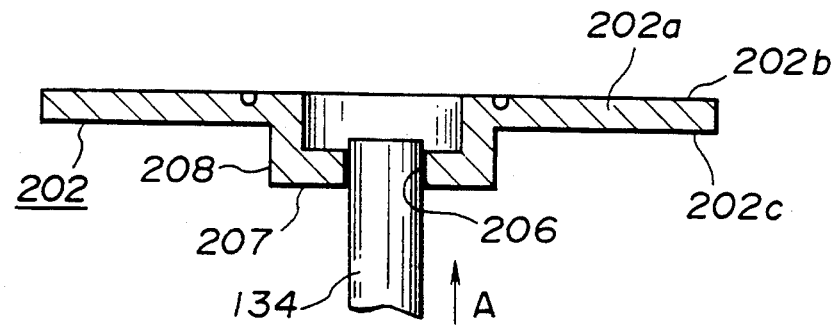
FIG. 28 is a schematic cross-sectional view showing the state in which an engaging opening is perforated in the raised portion of the disc substrate by a perforating punch provided in the metal mold device shown in FIG. 18.
Figure 29:
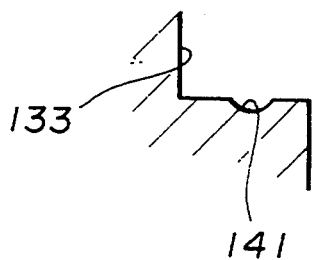
FIG. 29 is a partial cross-sectional view showing another example of a metal mold releasing resisting means formed on the inner peripheral surface of the recess for shaping the raised portion of the disc substrate.

Besides, with the metal mold device shown in FIG. 18, since the perforating punch 146 is provided at the movable metal mold 132 having the recess 145 for shaping the loading reference surface 207 provided at the distal end face of the raised portion 208, the perforating punch 146 is projected for perforating the engaging opening 206 at the center of the raised portion 208 from the loading reference surface 207, as shown in FIG. 28. Consequently, the loading reference surface 207 may be formed to a highly accurate smooth surface, without producing punching burrs otherwise produced on the surface 107 due to the perforating punch 146, to permit the rim of the engaging opening 206 engaged by the centering member to be molded with high molding accuracy.

Although the sliding member 148 is biased by compressed air in a direction of being projected from the movable metal mold 132, it may be biased in this manner by a mechanical biasing means, such as a spring, in a direction of being projected from the movable metal mold 132.

Although the engaging bosses 155, 156 are provided on the inner peripheral surfaces of the recess 145 and the sliding member 148, it suffices to provide only one of such engaging bosses if a mold releasing resistance larger than that provided from the fixed metal mold 121 provided with the stamper 129 may be assured.

Besides, although the engaging boss 155 is projected towards the disc substrate 202 on the inner peripheral surface of the recess 145, so as to be used as a mold releasing resisting means, since it suffices to develop a mold d releasing resisting means at the time of releasing the disc substrate 202 from the mold unit, an engaging recess 158 may be formed as a mold releasing resistance at the outer peripheral surface of the raised portion 208 of the disc substrate 202.

What is claimed is:

1. A metal mold device for molding a disc substrate from a synthetic resin material, said disc substrate having a raised portion at a radially inner surface of the main portion of the disc substrate, comprising;
    a fixed metal mold;
    a movable metal mold arranged with said fixed metal mold for defining a mold cavity; and
    mold releasing resisting means, provided in one of said fixed metal mold an said movable metal mold, for exerting a predetermined small retaining force on the disc substrate so as to retain said disc substrate in a predetermined position on said one of said fixed metal mold and said movable metal mold when said movable metal mold is separated from said fixed metal mold,
    wherein said mold releasing resisting means is disposed in said one of said fixed metal mold and said movable metal mold so as to be engageable with an outer peripheral surface of said raised portion of the main portion of the disc substrate being molded.

2. (amended) A metal mold device for molding a disc substrate from a synthetic resin material, said disc substrate having a raised portion at a radially inner surface of the main portion of be disc substrate, comprising:
    a fixed metal mold;
    a movable metal mold arranged with said fixed metal mold for defining a mold cavity; and
    mold releasing resisting means, provided in one of said fixed meal mold and said movable metal mold, for exerting a predetermined small retaining force on the disc substrate so to retain said disc substrate in a predetermined position on said one of said fixed metal mold and said movable metal mold when said movable metal mold is separated from said fixed metal mold,
    wherein said mold releasing resisting means is disposed in said one of said fixed metal mold and said movable metal mold so as to be engageable with an outer rim of said disc substrate and with an outer peripheral surface of said raised portion.

3. A metal mold device as defined in claim 1, wherein said mold releasing resisting means comprises a boss.

4. A metal mold device as defined in claim 1, wherein said mold releasing resisting means comprises a recess.

5. A metal mold device as defined in claim 1, further comprising:
    a perforating punch for perforating a through-hole in said raised portion said perforating punch being disposed in said movable metal; and
    a sliding member reciprocally mounted on an outer periphery of said movable metal mold for shaping an outer peripheral surface of said disc substrate.

6. A metal mold device as for molding a disc substrate including a main portion having fine pits and lands or grooves on a first major surface and a raised portion which projects from a second and opposite major surface of the main portion, said raised portion having a central through-hole and a distal end face which forms a loading reference surface for loading on a disc rotating and driving means, said metal mold device comprising:
    a fixed metal mold;
    a movable metal mold cooperating with said fixed metal mold for defining a mold cavity; in which said disc substrate is molded;
    a stamper arranged on a disc substrate molding surface of said fixed metal mold;
    a perforating punch for perfecting a through-hole in said raised portion, said perforating punch being disposed in said movable metal mold;
    a sliding member reciprocally disposed about the outer periphery of said movable metal mold for shaping the outer peripheral surface of said disc substrate; and
    metal mold releasing resisting means, disposed with one of said movable metal mold and said fixed metal mold, for exerting a predetermined small retaining force on said disc substrate for retaining the disc substrate in a predetermined position when said movable metal mold is separated from said fixed metal mold,
    wherein said mold releasing resisting means is disposed with said one of said fixed metal mold and said movable metal mold so as to be engageable with an outer peripheral surface of said raised portion.

7. A metal mold device as for molding a disc substrate including a main portion having fine pits and lands or grooves on a first major surface and a raised portion which projects from a second and opposite major surface of the main portion, said raised portion having a central through-hole and a distal end face which forms a loading reference surface for loading on a disc rotating and driving means, said metal mold device comprising:
    a fixed metal mold;
    a movable meal mold cooperating with said fixed metal mold for defining a mold cavity; in which said disc substrate is molded;
    a stamper arranged on a disc substrate molding surface of said fixed metal mold;
    a perforating punch for perforating a through-hole in said raised portion, said perforating punch being disposed in said movable metal mold;
    a sliding member reciprocally disposed about the outer periphery of said movable metal mold for shaping the outer peripheral surface of said disc substrate; and metal mold releasing resisting means disposed with one of said movable metal mold and said fixed metal mold, for exerting a predetermined small retaining force on said disc substrate for retaining the disc substrate in a predetermined position when said movable metal mold is separated from said fixed metal mold, wherein said mold releasing resisting means is disposed with said one of said fixed metal mold and said movable metal mold so as to be engageable with one of an outer rim of said main portion of the disc substrate and an outer rim of said raised portion.

8. A metal mold device as defined in claim 6, wherein said mold releasing resisting means comprises a boss.

9. A metal mold device as defined in claim 6, wherein said mold releasing resisting means comprises a recess.

* * * * *